(12) United States Patent
Jung et al.

(10) Patent No.: US 7,728,789 B2
(45) Date of Patent: Jun. 1, 2010

(54) 2D AND 3D IMAGE DISPLAY APPARATUS

(75) Inventors: Sung-yong Jung, Suwon-si (KR);
Dae-sik Kim, Suwon-si (KR);
Kyung-hoon Cha, Yongin-si (KR);
Tae-hyeun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1094 days.

(21) Appl. No.: 11/395,306

(22) Filed: Apr. 3, 2006

(65) Prior Publication Data
US 2006/0290888 A1 Dec. 28, 2006

(30) Foreign Application Priority Data
Jun. 25, 2005 (KR) .................. 10-2005-0055416

(51) Int. Cl.
*G03B 21/14* (2006.01)

(52) U.S. Cl. .................... 345/32; 345/77; 345/690; 345/697; 348/51; 348/57; 348/58; 353/8; 353/20; 359/462; 359/465; 359/483

(58) Field of Classification Search ............ 345/1.1, 345/32, 84, 87, 690; 348/42, 51, 53, 54, 348/57, 58; 349/96; 353/7, 8; 359/462, 359/466
See application file for complete search history.

(56) References Cited

U.S. PATENT DOCUMENTS

| | | | |
|---|---|---|---|
| 2,631,496 A | | 3/1953 | Rehorn |
| 4,343,535 A | * | 8/1982 | Bleha, Jr. .................. 349/9 |
| 5,315,377 A | * | 5/1994 | Isono et al. .............. 348/51 |
| 5,416,510 A | * | 5/1995 | Lipton et al. ............. 348/43 |
| 5,786,591 A | * | 7/1998 | Asahi ....................... 250/226 |
| 5,825,441 A | * | 10/1998 | Hornell et al. ............ 349/77 |
| 5,875,055 A | | 2/1999 | Morishima et al. |
| 6,055,103 A | | 4/2000 | Woodgate et al. |
| 6,215,590 B1 | * | 4/2001 | Okano ....................... 359/464 |
| 6,400,394 B1 | * | 6/2002 | Kim et al. ................ 348/51 |
| 6,697,550 B2 | * | 2/2004 | Chen ........................ 385/22 |
| 6,710,920 B1 | | 3/2004 | Mashitani et al. |
| 7,213,922 B2 | * | 5/2007 | Suzuki et al. ............ 353/31 |

(Continued)

FOREIGN PATENT DOCUMENTS

JP 11-084131 A 3/1999

(Continued)

*Primary Examiner*—Bipin Shalwala
*Assistant Examiner*—Vince E Kovalick
(74) *Attorney, Agent, or Firm*—Sughrue Mion, PLLC

(57) ABSTRACT

A 2D and 3D image display apparatus including: a display panel forming an image by spatially modulating an input image signal; a polarization conversion device converting a polarization direction of a beam incident into the polarization conversion device according to a voltage applied in synchronization with the image signal; and a switching barrier unit including first polarization units having a first polarization direction and second polarization units having a second polarization direction in an alternate manner, and transmitting the beam passing the polarization conversion device through at least one of the first polarization unit and the second polarization unit. Therefore, a 3D image can be displayed without degrading a horizontal resolution thereof by using a combination of polarization devices with low fabrication costs, which may utilize a time-sequential display method.

20 Claims, 11 Drawing Sheets

U.S. PATENT DOCUMENTS

2004/0223379 A1* 11/2004 Tomisawa .................... 365/200
2004/0252186 A1* 12/2004 Mashitani et al. ............. 348/51
2005/0060051 A1   3/2005 Mattice et al. ................ 700/92
2005/0280697 A1* 12/2005 Miyagawa .................. 347/241

FOREIGN PATENT DOCUMENTS

| KR | 10-2004-0071638 A | 8/2004 |
|----|-------------------|--------|
| KR | 10-2004-0077596 A | 9/2004 |

* cited by examiner

2D AND 3D IMAGE DISPLAY APPARATUS

CROSS-REFERENCE TO RELATED PATENT APPLICATIONS

This application claims priority from Korean Patent Application No. 10-2005-0055416, filed on Jun. 25, 2005, in the Korean Intellectual Property Office, the disclosure of which is incorporated herein in its entirety by reference.

BACKGROUND OF THE INVENTION

1. Field of the Invention

Apparatuses consistent with the present invention relate to an image display apparatus, and more particularly, to a two-dimensional (2D) and three-dimensional (3D) image display apparatus having high resolution and low fabrication costs.

2. Description of the Related Art

A 3D image is provided in accordance with the principles of stereo vision. Binocular parallax, a characteristic due to the positions of the left eye and right eye located about 65 mm apart from each other, is the most important factor producing a 3D effect. 3D image displays can be divided into displays using glasses and glassless displays. Glassless displays are divided into parallax barrier-type displays and lenticular-type displays.

The parallax barrier-type and the lenticular-type are similar to each other in that a special optical plate, for example, a barrier or a lenticular lens, is located in front of/behind a display panel to spatially divide images seen from different viewpoints. The images from different viewpoints are separated and form certain viewing zones, and thus, a user can see a 3D image only when eyes of the user are located in the corresponding viewing zones.

The parallax barrier-type display alternately provides images that should be seen respectively by the left and right eyes in the form of a vertical pattern or a photo using an extremely thin vertical lattice column, i.e., a barrier. By doing so, a vertical pattern image that is to be provided to the left eye and a vertical pattern image that is to be provided to the right eye are separated by the barrier and images from different viewpoints are seen by the left and the right eyes, respectively, so that a stereo image is perceived.

According to a parallax barrier-type display disclosed in U.S. Pat. No. 5,315,377 and shown in FIG. 1, a parallax barrier 10 having openings 5 of a vertical lattice shape and masks 7 is disposed on a liquid crystal panel 3 having image information for the left eye (LE) Ln and image information for the right eye (RE) Rn of a viewer, and the image is separated through the openings 5 of the parallax barrier 10. The image information Ln input into the LE and the image information Rn input into the RE are alternately arranged in a horizontal direction on the liquid crystal panel 3.

For example, a pixel having the left image information Ln and a pixel having the right image information Rn become a set, and pixels on left and right sides of the opening 5 become pixels for different view points to form a 3D image. For example, a first image for the LE is perceived by the LE and a first image for the RE is perceived by the RE of the viewer, a second image for the LE is perceived by the LE and a second image for the RE is perceived by the RE of the viewer, and thus, left and right pixels are respectively perceived by the LE and RE.

According to the above display, the image is formed through the opening 5 and blocked by the mask 7, and thus, the images L are formed, e.g., at odd-numbered lines, and the images R are formed, e.g., at even-numbered lines, as shown in FIG. 2.

Therefore, the resolution of an image display is degraded, and the brightness of the 3D image is also degraded.

The barrier used for separating viewports is generally fabricated by printing periodically repeated stripes on a transparent film or a glass plate. However, the barrier can also be fabricated in an electrical way. Then, as shown in FIG. 3, a liquid crystal display (LCD) panel 28 performing as the barrier is further disposed on a front surface of a display panel 46 for displaying images. The LCD 28 can actively control the shape of barrier, however, since an additional LCD panel should be disposed besides the display panel for displaying images, fabrication processes become complex and fabrication costs rise.

SUMMARY OF THE INVENTION

Exemplary embodiments of the present invention provide a 2D and 3D image display apparatus that can selectively display 2D images and 3D images, display 3D images without lowering the resolution, and be fabricated in a simple way.

According to an exemplary aspect of the present invention, there is provided a two-dimensional (2D) and three-dimensional (3D) image display apparatus including: a display panel forming an image by spatially modulating an input image signal; a polarization conversion device converting a polarization direction of a beam incident onto the polarization conversion device according to a voltage applied in synchronization with the image signal; and a switching barrier unit including first polarization units having a first polarization direction and second polarization units having a second polarization direction in an alternate manner, and transmitting the beam passing the polarization conversion device through at least one of the first polarization unit and the second polarization unit.

According to another exemplary aspect of the present invention, there is provided a 2D and 3D image display apparatus including: a display panel forming an image by spatially modulating an input image signal; a polarization conversion device converting a polarization direction of a beam incident into the polarization conversion device according to a voltage applied in synchronization with the image signal; and a switching barrier unit including a partial phase delaying plate, in which phase delaying units delaying a phase of the beam output from the polarization conversion device and transmission units transmitting the beam output from the polarization conversion device are arranged in an alternate manner, and a polarization plate disposed at a back of the partial phase delaying plate.

The apparatus may further include: a voltage driving source applying voltages to the polarization conversion device.

The first polarization unit and the second polarization unit may have straight polarization directions crossing each other at a right angle.

The first polarization direction or the second polarization direction may be the same as a polarization direction of an image beam output from the display panel.

The display panel may be a liquid crystal display (LCD) or a ferroelectric liquid crystal display (FLCD).

The polarization conversion device may convert the polarization direction of the incident beam by 45° to display a 2D image.

A pitch p between the neighboring first polarization units and between the neighboring second polarization units may be:

$$p = \frac{2im}{(m+1)},$$

where m=e/i, e is an average distance between the left eye and the right eye, and i is a pitch between pixels on the display panel.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF THE INVENTION

Figure 1:
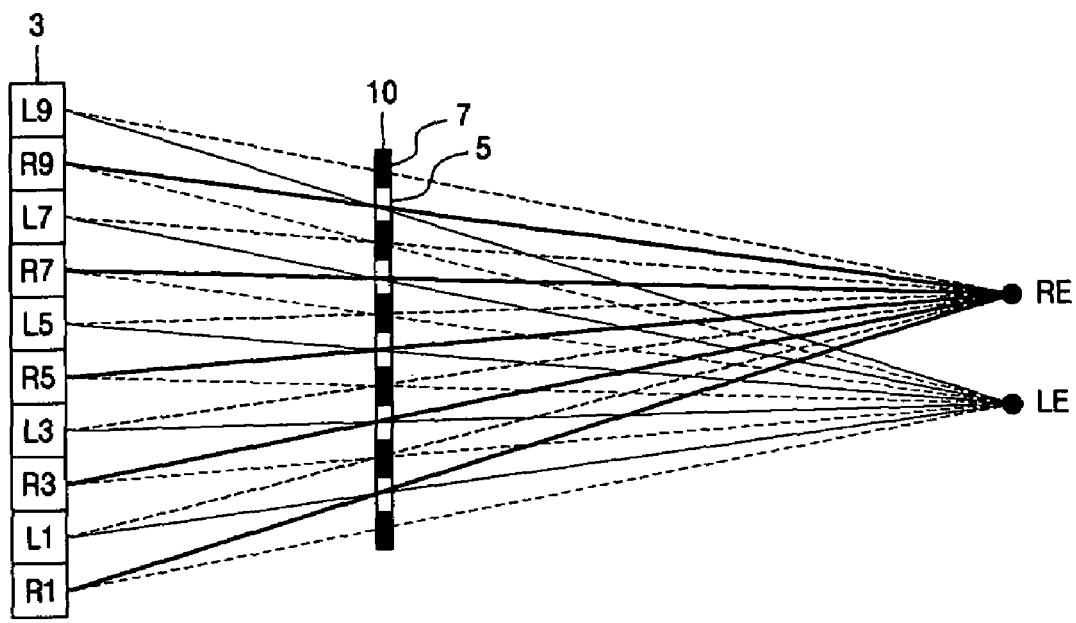
FIG. 1 is a schematic view of a 3D image display apparatus according to a parallax barrier-type display disclosed in U.S. Pat. No. 5,315,377.
Figure 2:
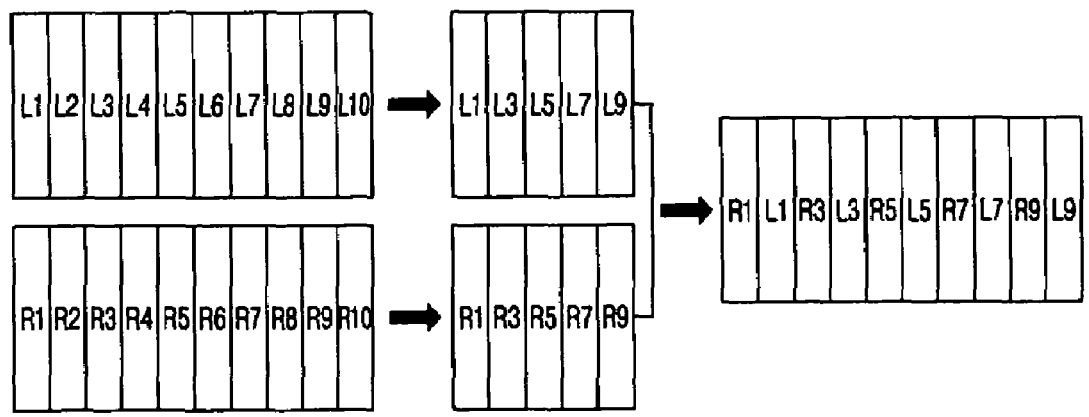
FIG. 2 is a view of displaying images for the right eye and image for the left eye displayed in the 3D image display apparatus of FIG. 1.
Figure 3:
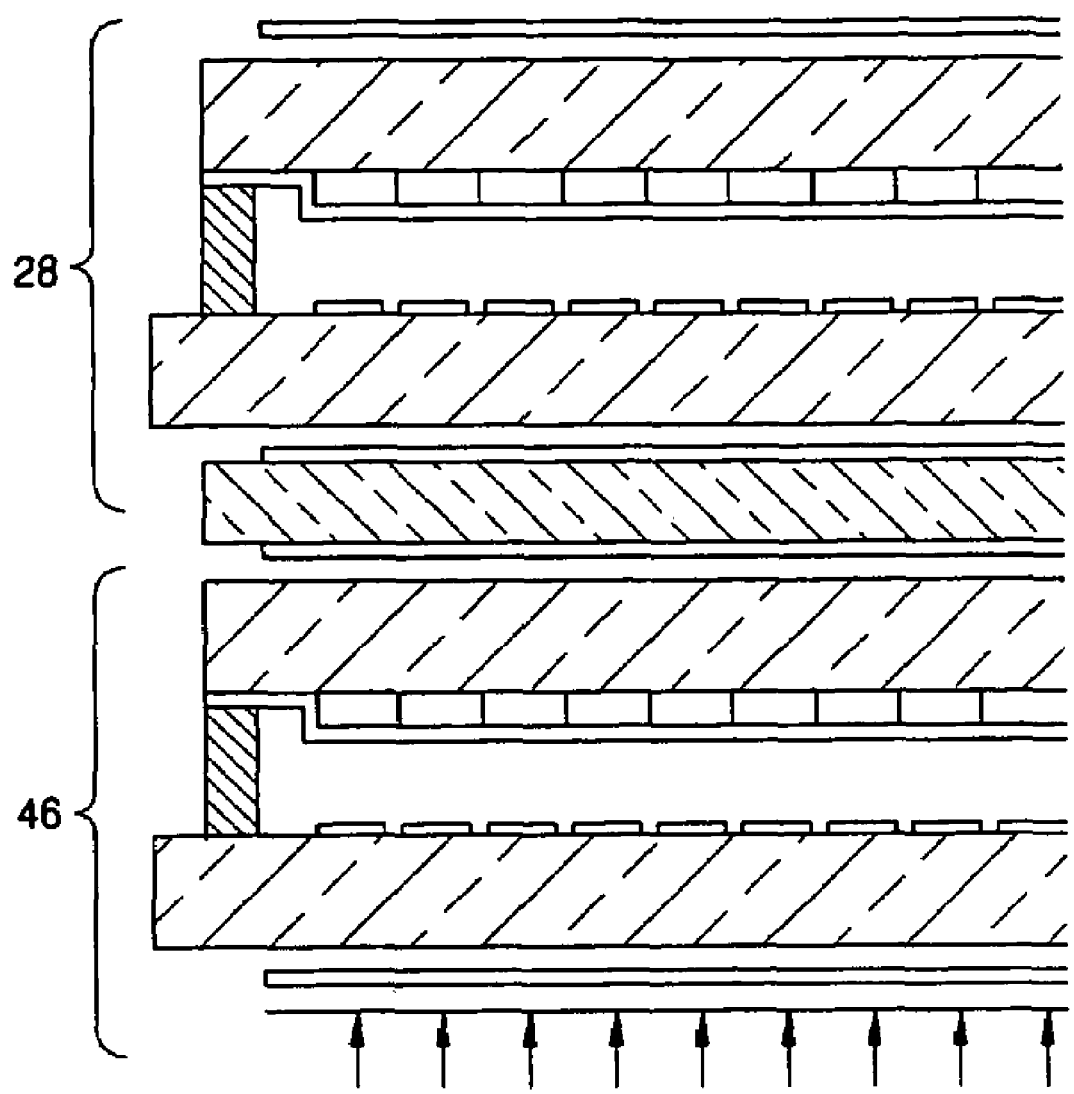
FIG. 3 is a view of a 3D image display apparatus using a liquid crystal display (LCD) panel as a barrier device according to the conventional art.
Figure 4:
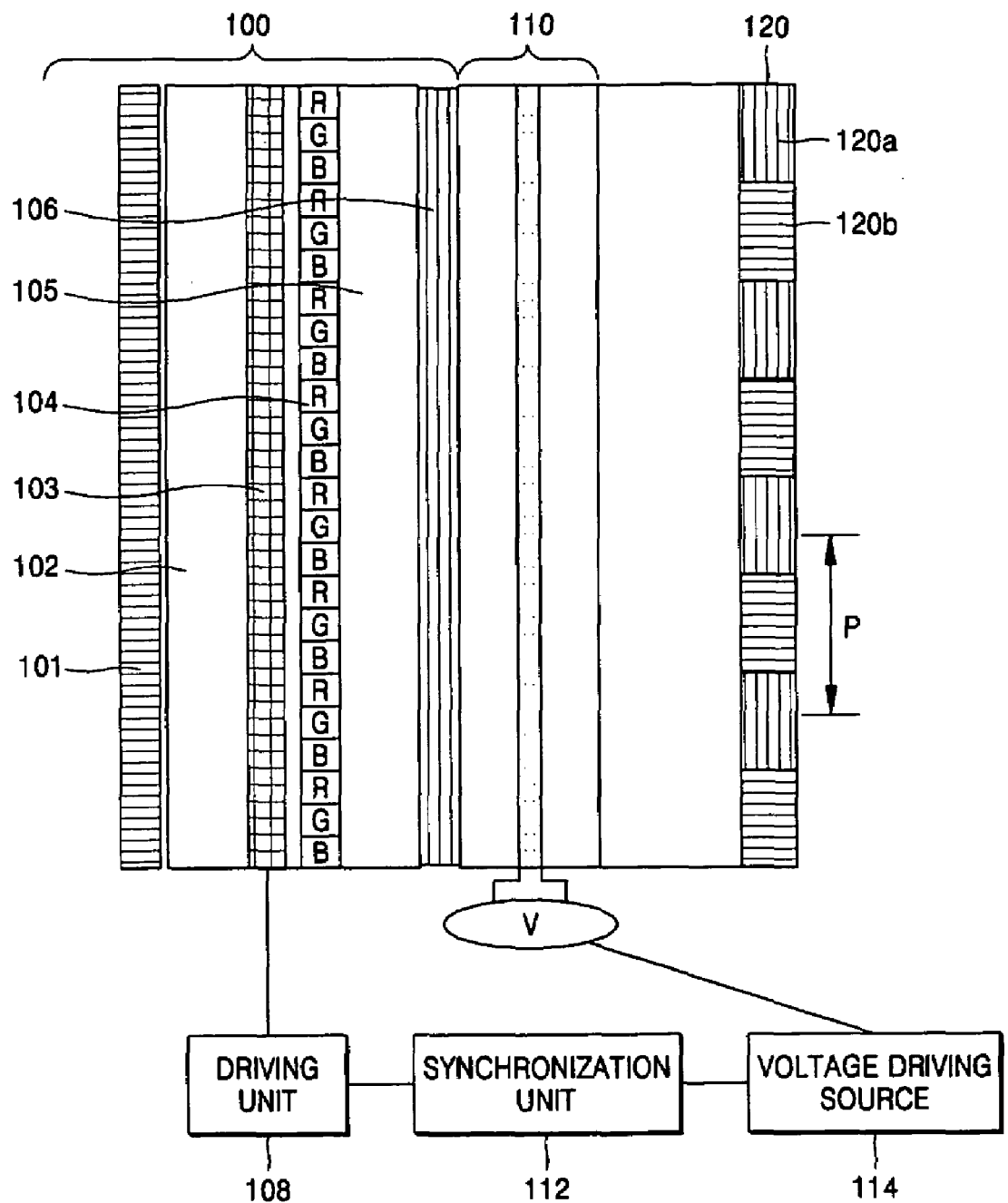
FIG. 4 is a schematic block diagram of a 2D and 3D image display apparatus according to an exemplary embodiment of the present invention.

Referring to FIG. 4, a 3D image display apparatus according to the exemplary embodiments of the present invention includes a display panel 100 which forms an image, a polarization conversion device 110 which changes a polarization direction of an image beam output from the display panel 100 according to applied voltages, and a switching barrier unit 120 having a predetermined pattern for transmitting or blocking a beam that has passed out of the polarization conversion device 110 according to a polarization direction of the beam.

The display panel 100 may be, for example, an LCD or a ferro liquid crystal display (FLCD), which is a polarization dependant device, or a transmission-type or a reflection-type display panel. The display panel 100 includes a first polarization plate 101, a first glass plate 102, a thin film transistor (TFT) 104 driven by a TFT driving unit 103, a second glass plate 105, and a second polarization plate 106.

The polarization conversion device 110 can be, for example, a liquid crystal polarization converter which changes its polarization direction according to voltages applied to the liquid crystal. When a first voltage V1 is applied to the polarization conversion device 110 from a voltage driving source 114, an incident beam passes through the device 110 without changing its polarization direction. When a second voltage V2 is applied to the polarization conversion device, a polarization direction of the incident beam is changed by 90°, and when a third voltage V3 is applied to the polarization conversion device, the polarization direction of the incident beam is changed by 45°. A voltage is applied to the polarization conversion device 110 after being synchronized by a synchronization unit with the image output from the display panel 100.

The switching barrier unit 120 includes first polarization units 120a having a first polarization direction and second polarization units 120b having a second polarization direction, which are arranged in an alternate manner. The first polarization direction and the second polarization direction can cross each other at a right angle, for example, the first polarization direction is the same as the polarization direction of the beam emitted from the display panel 100, and the second polarization direction crosses the first polarization direction of the beam emitted from the display panel 100 at a right angle. When the image beam formed by the display panel 100 passes through the switching barrier unit 120, the beam passes through the first polarization unit 120a and is blocked by the second polarization unit 120b, or the beam is blocked by the first polarization unit 120a and passes through the second polarization unit 120b. Therefore, a 3D image can be realized without degrading the resolution of the image.

A pitch (p) between neighboring first polarization units 120a or between neighboring second polarization units 120b can be determined as follows.

$$p = \frac{2im}{(m+1)} \quad (1)$$

where m=e/i, e is an average distance between the LE and the RE, for example, about 65 mm, and i is a pitch between pixels of the display panel. It will be appreciated that the average distance e may vary. The pitch p according to Equation 1 may be the same as the pitch between barriers in a conventional fixed barrier-type display. In addition, Equation 1 can be applied to the general barrier structure having two-viewpoints.

Processes of displaying a 3D image in the 3D image display apparatus according to an exemplary embodiment are described as follows.

Figure 5A:
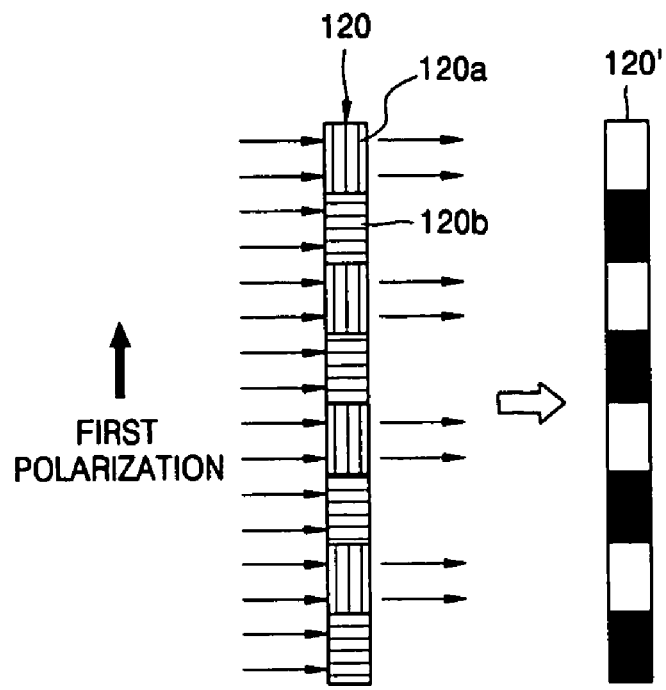
FIG. 5A is a view of a barrier unit when a first polarization beam is incident onto a switching barrier unit formed in the 2D and 3D image display apparatus according to an exemplary embodiment of the present invention.

Referring to FIG. 5A, image signals of one frame input into the display panel 100 include a first field image signal and a second field image signal, which are input time-sequentially. When a beam of the first field image output from the display panel 100 has a first polarization direction, for example, S polarization, the voltage V1 synchronized with the first field image is applied to the polarization conversion device 110, and thus, the polarization direction of the first field image beam is not changed and the first field image beam is incident onto the switching barrier unit 120 after passing through the polarization conversion device 110. The first polarization beam passes through the first polarization unit 120a of the switching barrier unit 120 and is blocked by the second polarization unit 120b. Consequently, the switching barrier unit 120 can operate equivalently as the barrier denoted by reference numeral 120'.

Figure 5B:
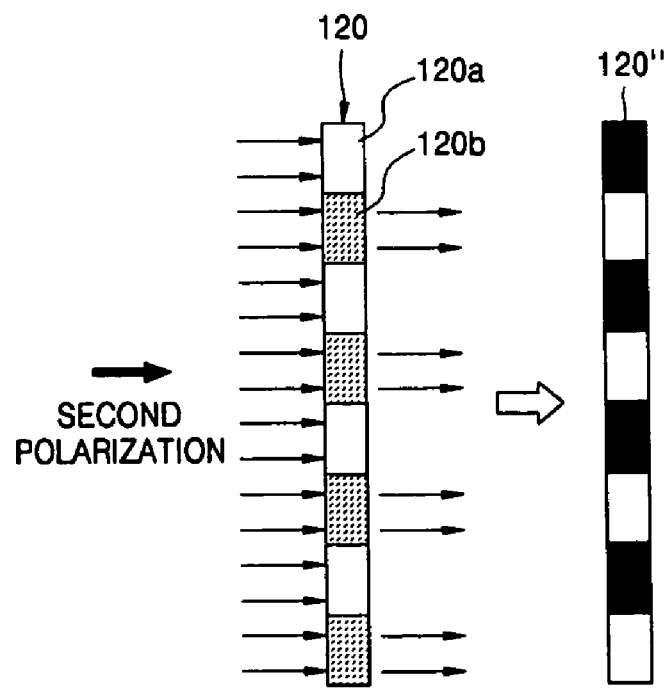
FIG. 5B is a view of a barrier unit when a second polarization beam is incident into a switching barrier unit formed in the 2D and 3D image display apparatus according to an exemplary embodiment of the present invention.

Referring to FIG. 5B, when the second field image beam is output from the display panel 100, the voltage V2 synchronized with the second field image is applied to the polarization conversion unit 110, and thus, the polarization direction of the second field image beam is changed into the second polarization direction, for example, P polarization direction, and the beam is incident onto the switching barrier unit 120. The second polarization beam is blocked by the first polarization unit 120a of the switching barrier unit 120 and passes through the second polarization unit 120b, and consequently, the switching barrier unit 120 can operate equivalently as the barrier denoted by reference numeral 120". Openings transmitting the beam and non-openings blocking the beam according to the polarization direction of the beam are time-sequentially switched in the switching barrier unit 120, and thus, a 3D image can be realized without degrading the resolution thereof.

Figure 6:
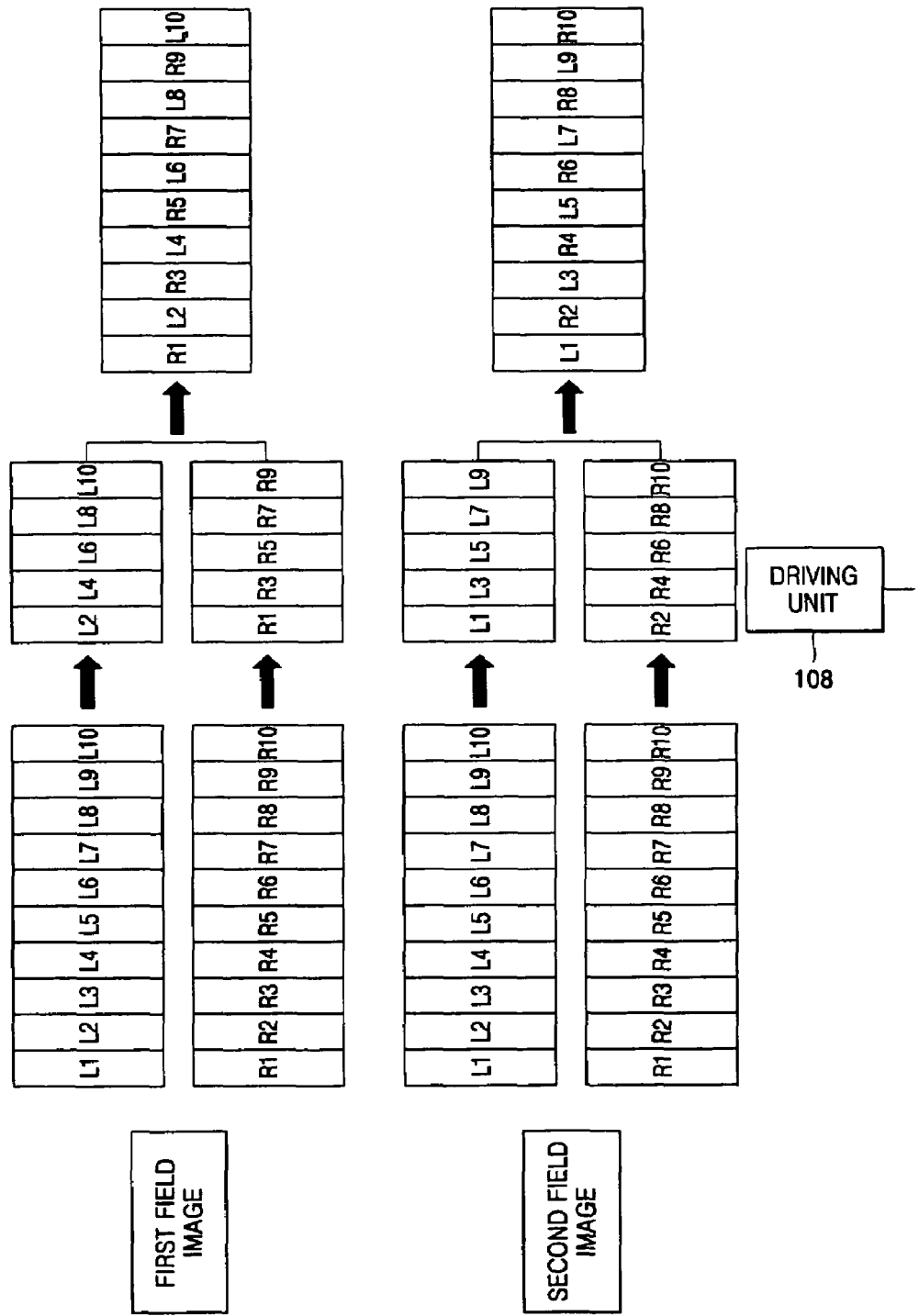
FIG. 6 is a diagram of processes for displaying a 3D image when a first field image signal and a second field image signal are sequentially input to the 2D and 3D image display apparatus according to an exemplary embodiment of the present invention.

FIG. 6 is a diagram for displaying a 3D image without degrading the resolution thereof. That is, the first field image is separated into the image for a left eye (LE) and the image for a right eye (RE) after passing through the first polarization unit 120a of the switching barrier unit 120, and the second field image is separated into the image for LE and the image for RE after passing through the second polarization unit 120b of the switching barrier unit 120.

Figure 7A:
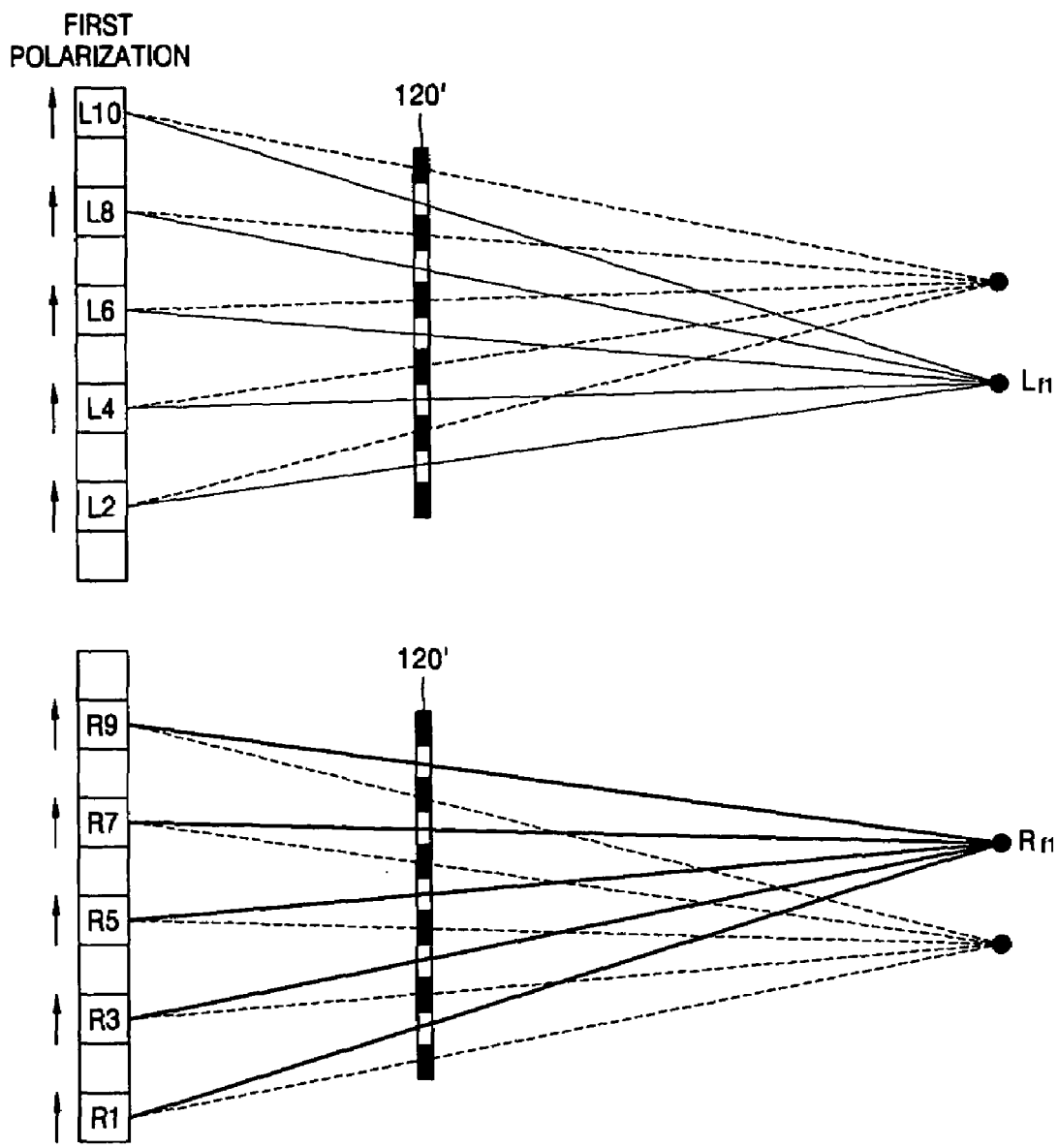
FIG. 7A is a view illustrating the principles of displaying a 3D image by separating a first field image having a first polarization direction into an image for the left eye and an image for the right eye in the 2D and 3D image display apparatus according to an exemplary embodiment of the present invention.

FIG. 7A is a view illustrating a case where the first field image having the first polarization direction that is not changed by the polarization conversion device 110 is separated into the image for the LE and the image for the RE as equivalently represented by the depiction of switching barrier unit 120'. The first field image is perceived as an even-numbered line image for the LE ($L_{f1}$) and odd-numbered line image for the RE ($R_{f1}$). In FIG. 7A, solid lines represent the beams passing through the openings of the switching barrier unit 120', and dotted lines represent the beams blocked by the non-openings of the switching barrier unit 120'. The images for the LE and the RE are separately depicted in FIG. 7A.

Figure 7B:
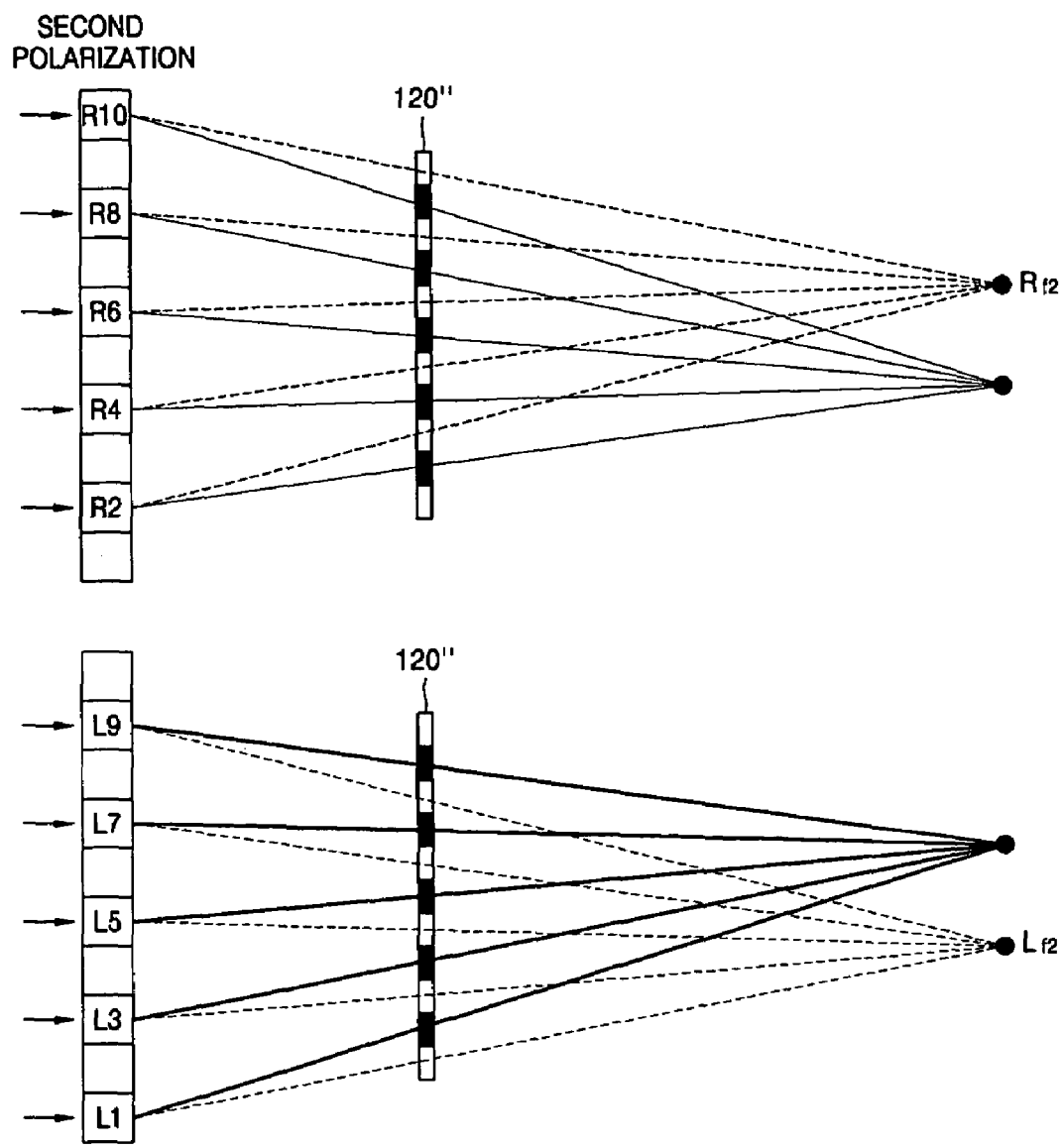
FIG. 7B is a view illustrating the principles of displaying a 3D image by separating a second field image having a second polarization direction into an image for the left eye and an image for the right eye in the 2D and 3D image display apparatus according to an exemplary embodiment of the present invention.

FIG. 7B is a view illustrating a case where the second field image having the polarization direction changed to the second polarization direction by the polarization conversion device 110 is separated into the image for the LE and the image for the RE denoted by dotted lines as equivalently represented by the depiction of the switching barrier unit 120". The second field image is perceived as an odd-numbered line image for the LE ($L_{f2}$) and an even-numbered line image for the RE ($R_{f2}$).

On the contrary, the first field image can be separated into the odd-numbered line image for LE and the even-numbered line image for RE, and the second field image can be separated into the even-numbered line image for LE and the odd-numbered line image for RE.

The first field image and the second field image are output alternately at a very fast speed such that the user cannot recognize the alternating output, and thus, a 3D image can be displayed without degrading the resolution thereof. In general, when an output period between the first field image and the second field image is 1/120 sec. or smaller, a viewer cannot see any image flickering. The operational speed can be realized using a special liquid crystal, such as a ferro liquid crystal (FLC) or an optical compensated bend (OCB).

Figure 8:
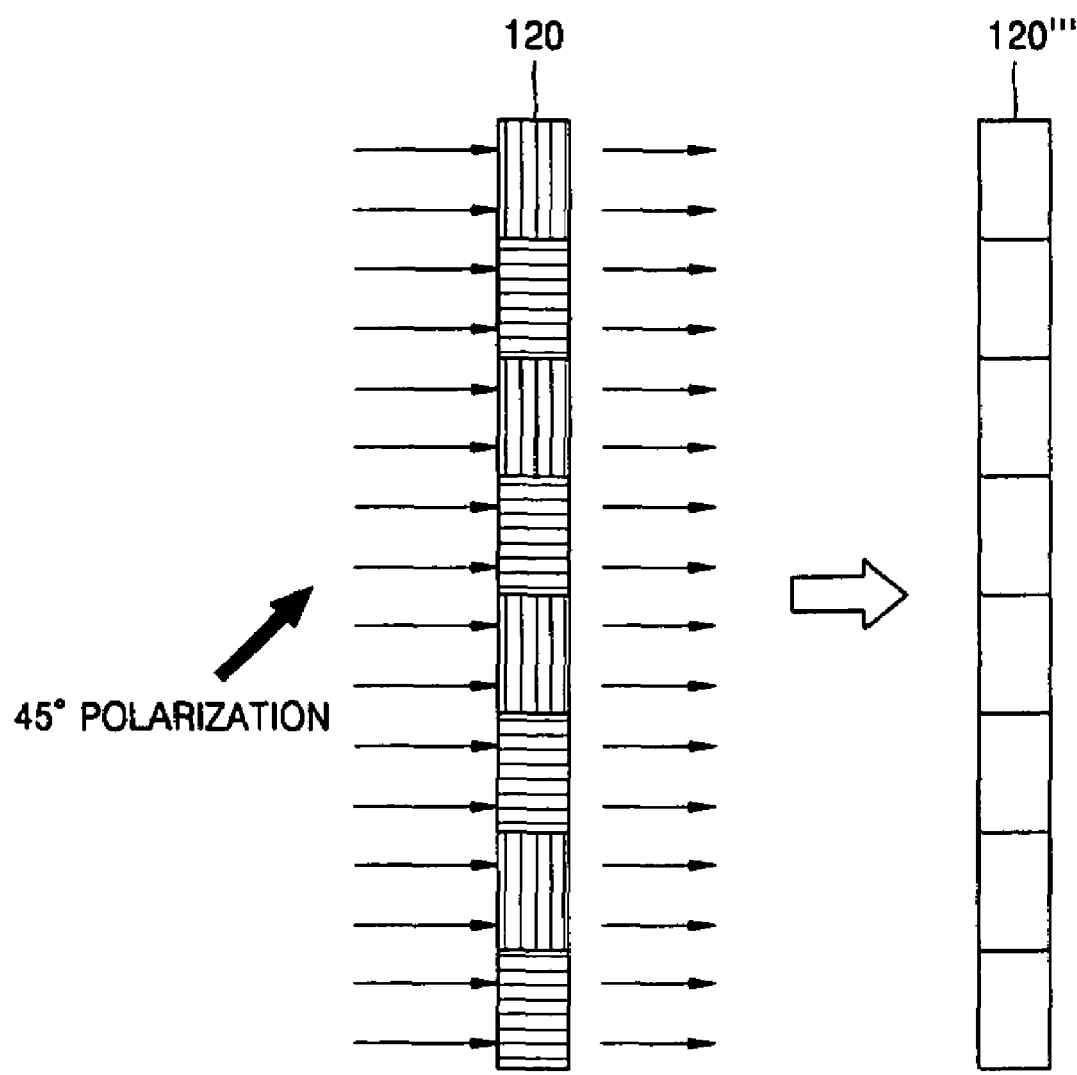
FIG. 8 is a view illustrating the principles of displaying a 2D image on the 2D and 3D image display apparatus according to an exemplary embodiment of the present invention.

An image display apparatus according to an exemplary embodiment of the present invention can display a 2D image besides the 3D image. When the first polarization beam output from the display panel 100 is incident onto the polarization conversion device 110 and the voltage V3 is applied to the polarization conversion device 110, the polarization direction of the beam is changed by 45°, and then, is incident onto the switching barrier unit 120. FIG. 8 illustrates the beam having a 45° polarization direction incident onto the switching barrier unit 120. The beam having the 45° polarization can pass through both of the first and second polarization units 120a and 120b. Although some of the incident beam is lost while passing through the switching barrier unit 120, the beam can pass through the first and second polarization units 120a and 120b, and thus, can be output as if the beam were passing through the equivalent switching barrier unit 120'''. Therefore, the image formed by the display panel can be displayed as a 2D image without being separated into the images for the LE and the RE.

As described above, the polarization direction of incident light is changed through the polarization conversion device 110 driven by the first voltage V1 and the second voltage V2 that are synchronized with the first and second field images respectively and sequentially applied, and then, the incident light having the changed polarization direction is incident onto the switching barrier unit 120. Therefore, a 3D image can be displayed without degrading the resolution thereof compared to the 2D image. The switching barrier unit 120 switches the barrier according to the polarization direction of the incident beam.

Figure 9:
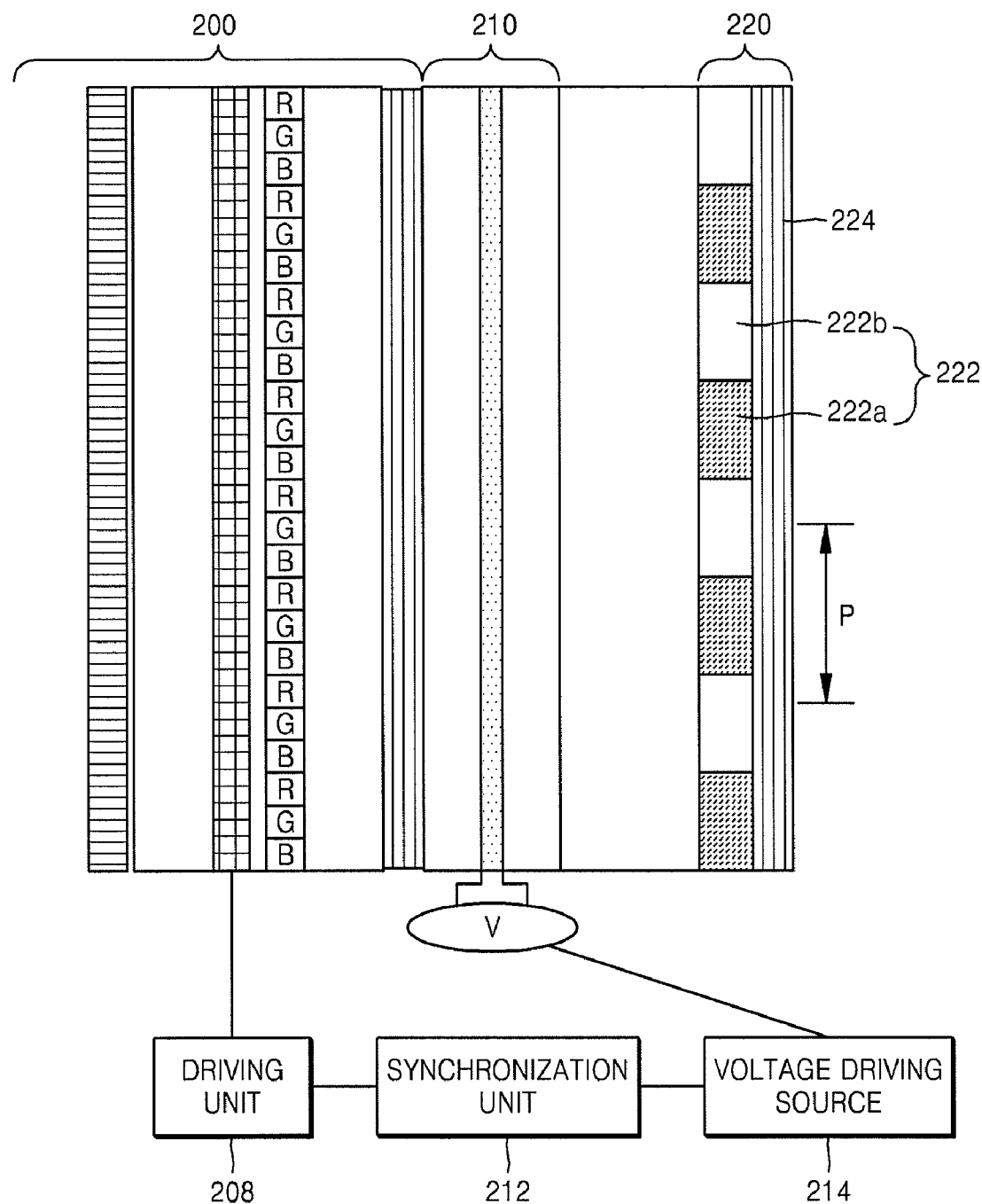
FIG. 9 is a schematic block diagram of a 2D and 3D image display apparatus according to another exemplary embodiment of the present invention.

Referring to FIG. 9, a 3D image display apparatus according to another exemplary embodiment of the present invention includes a display panel 200 forming an image, a polarization conversion device 210 converting the polarization direction of the image beam, and a switching barrier unit 220 having a predetermined pattern capable of transmitting/blocking the beam according to the polarization direction of the beam after passing through the polarization conversion device 210.

The display panel 200 forms the image through a spatial modulation by a driving unit 208. The display panel 200, for example, can be an LCD or an FLCD. The polarization conversion device 210 converts the polarization direction of the incident beam according to the voltage applied by a voltage driving source 214 and synchronized with the driving unit 208 through a synchronization unit 212. Detailed structures and operations of the display panel 200 and the polarization conversion device 210 are substantially the same as the display panel 100 and the polarization conversion device 110 of the previously described exemplary embodiment.

The switching barrier unit 220 includes a partial phase delaying plate 222, in which phase delaying units 222a and transmission units 222b are alternately and repeatedly arranged, and a polarization plate 224. A pitch p between the neighboring phase delaying units 222a and a pitch p between the neighboring transmission units 222b can be determined according to the above-described Equation 1. The phase delaying unit 222a is a half-wave plate to delay the polarization direction of the beam passing the polarization conversion device 210 by 90° angle, and thus, a S polarization beam is changed into a P polarization beam and a P polarization beam is changed into a S polarization beam. The beam passing through the transmission unit 222b can be transmitted without changing the polarization direction thereof. Consequently, the beams passing the partial phase delaying plate 222 include both of the first polarization beam and the second polarization beam, and one of the first polarization beam and the second polarization beam passes through the polarization plate 224 according to the polarization direction of the polarization plate 224.

Figure 10A:
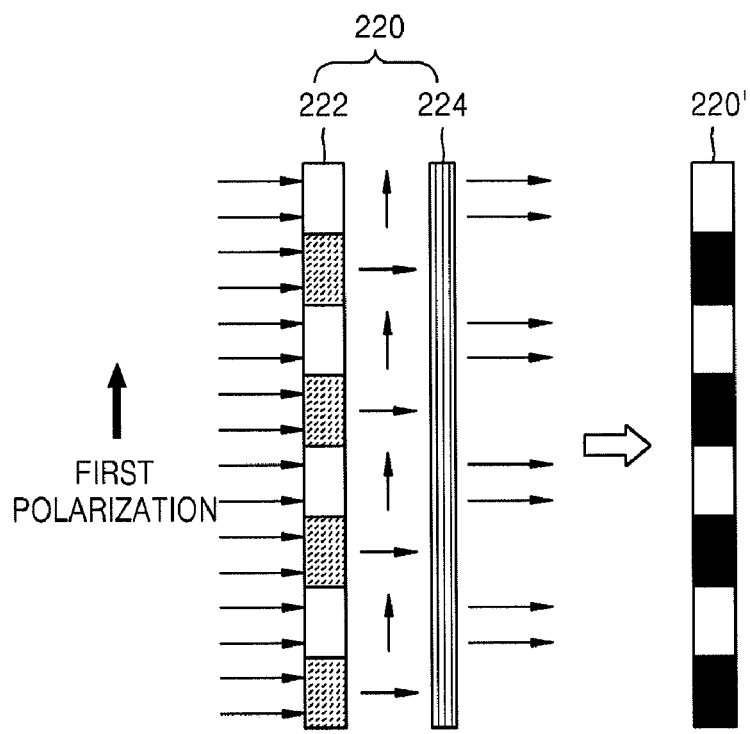
FIGS. 10A and 10B, respectively, are views of barrier units when a first polarization beam and a second polarization beam are incident onto a switching barrier unit installed in the 2D and 3D image display apparatus according to an exemplary embodiment of the present invention.
Figure 10B:
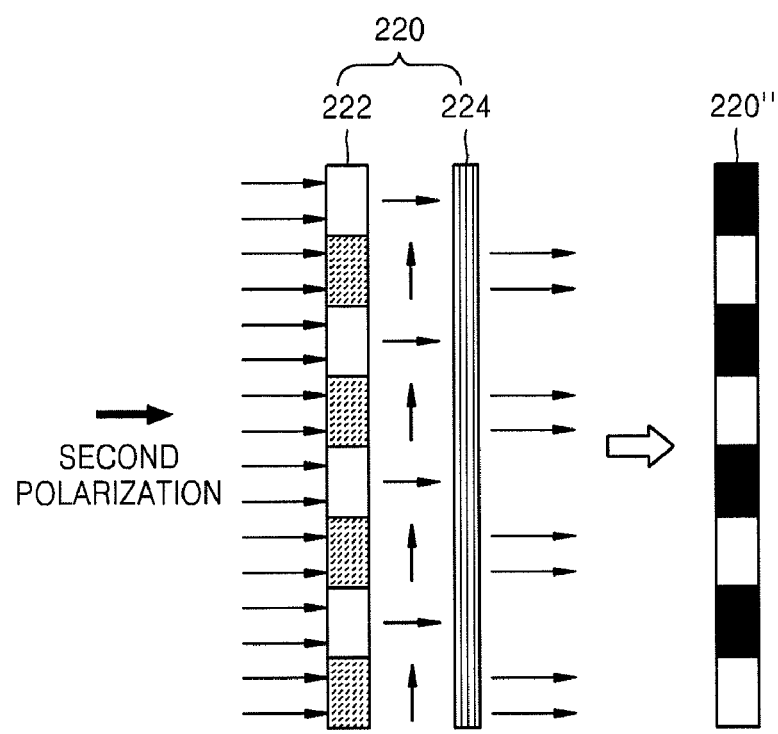

FIGS. 10A and 10B illustrate switching operation of the switching barrier unit 220. When the first polarization beam is incident onto the partial phase delaying plate 222 through the polarization conversion device 210, the first polarization beam is converted into the second polarization beam by the phase delaying unit 222a, and the first polarization beam can pass through the transmission unit 222b without changing the polarization direction thereof. In addition, when the second polarization beam is incident onto the partial phase delaying plate 222 through the polarization conversion device 210, the second polarization beam is converted into the first polarization beam by the phase delaying unit 222a, and the second polarization beam passes through the transmission unit 222b without changing the polarization direction thereof. In two cases where the first polarization beam is incident and the second polarization beam is incident, locations of the first polarization beam and the second polarization beam are reversed, and consequently, the polarization beams pass at different positions of the polarization plate 224 from each other according to the polarization direction of the polarization plate 224. For example, when the polarization plate 224 has the first polarization direction, the first polarization beam only can pass through the polarization plate 224 and the second polarization beam is blocked. In addition, positions of the polarization plate 224 transmitting the first polarization beam are sequentially switched, and thus, the polarization plate 224 can perform as the switching barrier. The above operation is equivalently represented by the depiction of switching barrier units 220' and 220" of FIGS. 10A and 10B.

Figure 11:
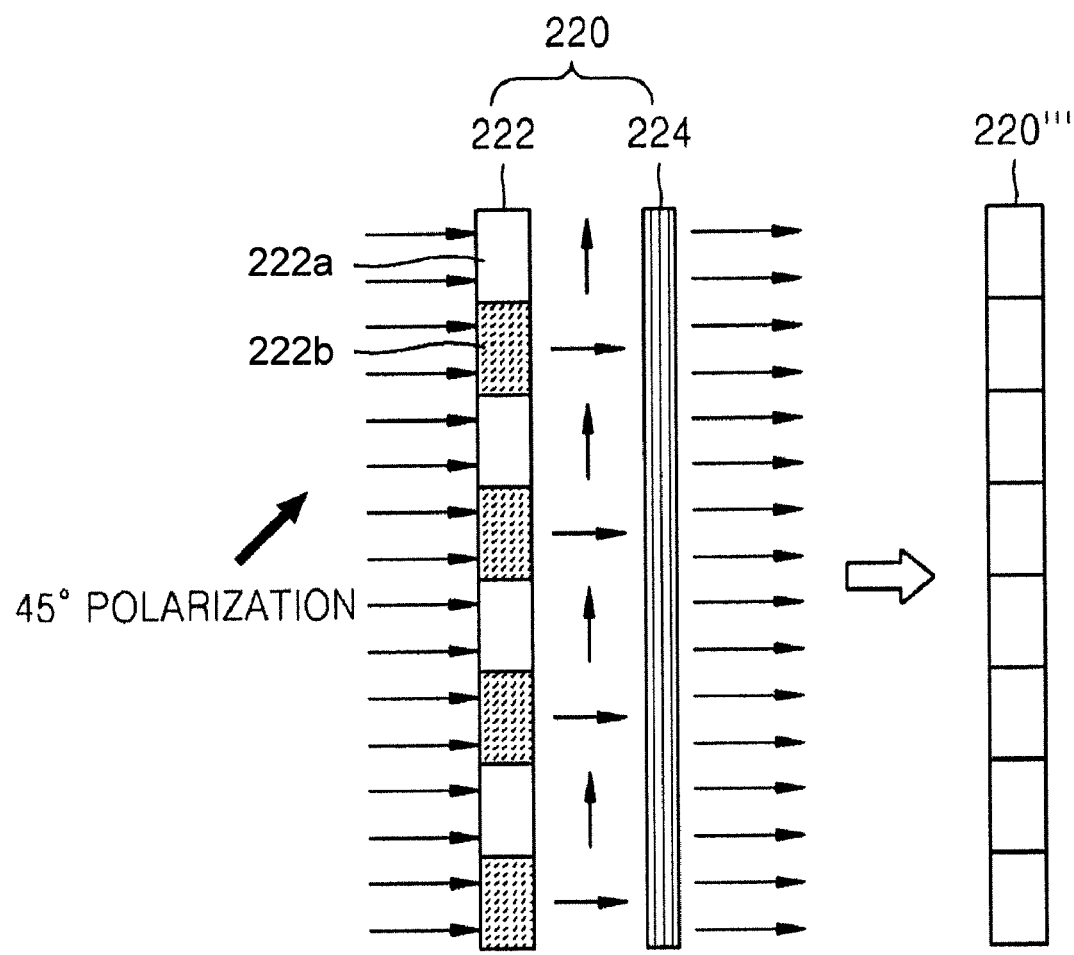
FIG. 11 is a view illustrating the principles of displaying a 2D image on the 2D and 3D image display apparatus according to an exemplary embodiment of the present invention.

FIG. 11 illustrates operations of the switching barrier unit 220 when a 2D image is displayed by the image display apparatus according to an exemplary embodiment of the present invention.

When the display panel 200 forms a 2D image, the third voltage V3 is applied to the polarization conversion device 210, and the polarization direction of the image beam is converted by the polarization conversion unit 210 by a 45° angle and is incident onto the switching barrier unit 220. The beam having a 45° polarization direction passes through both of the phase delaying unit 222a and the transmission plate 222b, and passes through the polarization plate 224. Consequently, as equivalently shown in the switching barrier unit 220''', the image can pass through the entire switching barrier unit 220, and thus, the image is not separated into the images for the LE and the RE, but is displayed as a 2D image.

According to an exemplary embodiment of the present invention, a 2D image display mode and a 3D image display mode can be discretionary selected, and the resolution of 3D image is not inferior to that of the 2D image.

As described above, according to the 3D image display apparatus of the exemplary embodiments of the present invention, a 3D image can be displayed without degrading the horizontal resolution thereof using combinations of polarization devices having low fabrication costs and a time-sequential display method. In addition, a 2D image also can be displayed by controlling a voltage applied to the polarization conversion device.

While exemplary embodiments of the present invention have been particularly shown and described, it will be understood by those of ordinary skill in the art that various changes in form and details may be made therein without departing from the spirit and scope of the present invention as defined by the following claims.

What is claimed is:

1. A two-dimensional (2D) and three-dimensional (3D) image display apparatus comprising:
   a display panel which forms an image by spatially modulating an input image signal;
   a polarization conversion device which converts a polarization direction of a beam incident onto the polarization conversion device according to a voltage applied in synchronization with the image signal; and
   a switching barrier unit comprising first polarization units having a first polarization direction and second polarization units having a second polarization direction disposed in an alternate manner, wherein the switching barrier unit transmits the beam which passes the polarization conversion device through at least one of the first polarization units and the second polarization units.

2. The apparatus of claim 1, further comprising:
   a voltage driving source which applies voltages to the polarization conversion device.

3. The apparatus of claim 1, wherein the first polarization units and the second polarization units have straight polarization directions which cross each other at a right angle.

4. The apparatus of claim 1, wherein at least one of the first polarization direction and the second polarization direction is the same as a polarization direction of an image beam output from the display panel.

5. The apparatus of claim 1, wherein a first field image signal and a second field image signal which forms an image of one frame are time-sequentially input into the display panel.

6. The apparatus of claim 5, wherein the first field image signal displays an odd-numbered line image for the right eye and an even-numbered line image for the left eye alternately, and the second field image signal displays an odd-numbered line image for the left eye and an even-numbered line image for the right eye alternately.

7. The apparatus of claim 5, wherein the first field image signal displays an even-numbered line image for the right eye and an odd-numbered line image for the left eye alternately, and the second field image signal displays an even-numbered line image for the left eye and an odd-numbered line image for the right eye alternately.

8. The apparatus of claim 1, wherein the display panel is one of a liquid crystal display and a ferroelectric liquid crystal display.

9. The apparatus of claim 1, wherein the polarization conversion device converts the polarization direction of the beam which is incident by 45° to display a 2D image.

10. The apparatus of claim 1, wherein a pitch (p) between the first polarization units which are adjacent and between the second polarization units which are adjacent is:

$$p = \frac{2im}{(m+1)},$$

where m=e/i, e is an average distance between a left eye and a right eye of a user, and i is a pitch between pixels on the display panel.

11. A 2D and 3D image display apparatus comprising:
a display panel which forms an image by spatially modulating an input image signal;
a polarization conversion device which converts a polarization direction of a beam incident into the polarization conversion device according to a voltage applied in synchronization with the image signal; and
a switching barrier unit comprising,
  a partial phase delaying plate with phase delaying units which delay a phase of the beam output from the polarization conversion device and transmission units which transmit the beam output from the polarization conversion device, the phase delaying units and the transmission units being arranged in an alternate manner, and
  a polarization plate disposed at a back of the partial phase delaying plate.

12. The apparatus of claim 11, further comprising:
a voltage driving source which applies voltages to the polarization conversion device.

13. The apparatus of claim 11, wherein a first field image signal and a second field image signal which form an image of one frame are time-sequentially input into the display panel.

14. The apparatus of claim 13, wherein the first field image signal displays an odd-numbered line image for the right eye and an even-numbered line image for the left eye alternately, and the second field image signal displays an odd-numbered line image for the left eye and an even-numbered line image for the right eye alternately.

15. The apparatus of claim 13, wherein the first field image signal displays an even-numbered line image for the right eye and an odd-numbered line image for the left eye alternately, and the second field image signal displays an even-numbered line image for the left eye and an odd-numbered line image for the right eye alternately.

16. The apparatus of claim 11, wherein the display panel is one of a liquid crystal display and a ferroelectric liquid crystal display.

17. The apparatus of claim 11, wherein the phase delaying units delay a polarization phase of the beam as much as half a wavelength thereof.

18. The apparatus of claim 11, wherein the polarization plate has the same polarization direction as that of an image beam output from the display panel.

19. The apparatus of claim 11, wherein the polarization conversion device displays a 2D image by converting the polarization direction of the beam which is incident by 45°.

20. The apparatus of claim 11, wherein a pitch (p) between first polarization units which are adjacent and between second polarization units which are adjacent is:

$$p = \frac{2im}{(m+1)},$$

where m=e/i, e is an average distance between a left eye and a right eye of a user, and i is a pitch between pixels on the display panel.

* * * * *